United States Patent
Silver

[15] 3,690,762
[45] Sept. 13, 1972

[54] METHOD OF PRODUCING A MICROFICHE

[72] Inventor: Julian Silver, White Plains, N.Y.

[73] Assignee: U.S. Dynamics Inc., Elmsford, N.Y.

[22] Filed: July 20, 1970

[21] Appl. No.: 56,393

[52] U.S. Cl. .....................355/77, 355/54, 355/132
[51] Int. Cl. ............................................G03b 27/32
[58] Field of Search...........................355/54, 40-43, 355/77, 132, 122, 5

[56] References Cited

UNITED STATES PATENTS

| | | | |
|---|---|---|---|
| 2,195,936 | 4/1940 | Perkins et al. | 355/132 |
| 3,259,037 | 7/1966 | Wilkinson | 355/40 X |
| 3,289,530 | 12/1966 | Samain | 355/43 X |
| 3,409,361 | 11/1968 | Hynes et al. | 355/42 |

Primary Examiner—Samuel S. Matthews
Assistant Examiner—Richard L. Moses
Attorney—Ralph L. Thomas and Thomas & Thomas

[57] ABSTRACT

A method of recording and displaying photographic images includes the steps of exposing a series of image areas on a film strip, leaving blank areas at predetermined locations on the film strip, processing the film strip to produce image transparencies thereon, arranging the film strip in the form of a helix with portions of each of the blank areas aligned, securing the blank areas to one another, cutting through the film strip in the blank areas to form the image areas into a matrix having the form of a parallelogram, and positioning the matrix to project selectively the images thereon for viewing purposes. The apparatus includes a photographic system with a camera for exposing a series of image areas on a film strip with blank areas disposed at predetermined locations on the film strip, and after the film is processed, the film strip is wound in the form of a helix on a drum or a cylinder with the unexposed areas disposed over a slot in the drum. The unexposed film areas are secured together, as by an adhesive, and the film is cut along the unexposed areas over the slot whereby a matrix in the form of a parallelogram is produced. The matrix in the form of a parallelogram is composed of a plurality of columns of photographic images with each column having a plurality of rectangular photographic film areas disposed in series. The rectangular film areas of each column are offset relative to the corresponding film areas of adjacent columns. An image viewer has a carrier which holds the matrix array of rectangular photographic and film areas, and the carrier may be moved in two dimension back and forth or right and left. The carrier has an arm which extends over an index mat which includes an array of rectangular elements likewise disposed in the format of a parallelogram. The carrier and the index mat have a pantographic type relationship whereby the position of the carrier is indicated by the index mat.

5 Claims, 11 Drawing Figures

Patented Sept. 12, 1972

INVENTOR
JULIAN SILVER

BY Thomas & Thomas

ATTORNEYS

METHOD OF PRODUCING A MICROFICHE

BACKGROUND OF THE INVENTION

1. This invention relates to photography and more particularly to photographic equipment and methods utilized in microfilming operations.

2. Microfilm systems employing a fiche, an array of photographs, have been limited heretofore to rectangular images. The roll of film is cut into strips with each strip having a fixed number of photographic images, and then the strips are manually arranged into a rectangular array. When the film strips are formed into a rectangular array by inserting such strips into preformed slots of a jacket, the cutting of the strips takes place at the line formed between adjacent images. It is customary practice in the art to provide blank spaces at selected intervals in the film strip and then cut the film strips at such blank spaces. Next the strips are arranged in a rectangular array, and they are secured together by an adhesive strip which contacts the film strips at the blank spaces disposed on each end of the strip. This practice results in the need for placing one piece of adhesive tape at one end of the film strips and placing a second piece of adhesive tape at the other end of the film strips. This rather tedious and cumbersome method of making a photographic array of rectangular images contributes to the high cost of microfilming operations. It is to the problem of improving the efficiency of microfilm operations, and thereby reducing costs, that this invention is directed.

SUMMARY OF THE INVENTION

In accordance with the principles of this invention a camera is operated to make photographic images on rectangular film areas of a photographic strip, and after a given number of frames have been shot or exposed, one or more frames are advanced without exposing them. This divides the photographic areas of the film strip into groups with blank spaces therebetween. After the film is processed, it is wrapped around a cylinder or drum which has a circumference equal to the length of an image group plus the length of the unexposed area. A strip of adhesive tape is placed over the film axially of the cylinder in contact with the unexposed or blank areas, and the film is then cut or sliced on a line running through the blank areas. This produces a matrix array of rectangular photographic images, and the matrix array has the form of a parallelogram. A microimage viewer has a carrier on which the matrix array is disposed, and the carrier is selectively positioned to permit each rectangular photographic area to be displayed for viewing operations. The carrier is provided with a handle which serves as a pointer, and the pointer extends over an index mat disposed on the image viewer. The index mat includes a matrix array of rectangular elements disposed in columns and rows, and the matrix array is in the form of a parallelogram corresponding to that of the matrix array of photographic images. As the arm of the carrier is moved selectively to position frames or film areas for viewing, the end of the arm is disposed over the index mat to indicate the location of the frame or image area displayed. The matrix array of photographic images on the carrier and the index mat have a pantographic type relationship.

It is a feature of this invention to provide an improved microfilm apparatus and method for performing microfilming operations which is relatively inexpensive.

It is another feature of this invention to provide an inexpensive and novel method for arranging a film strip having a plurality of rectangular photographs disposed in series thereon into a matrix array of rectangular photographs with the matrix array having the form of a parallelogram.

It is another feature of this invention to provide a novel arrangement for displaying photographs disposed in a matrix array which has the form of a parallelogram by disposing the matrix array on a carrier with the side of the matrix array being disposed angularly with respect to the side of the carrier and providing an index mat having coordinate elements disposed in columns and rows forming a matrix which likewise has the form of a parallelogram. A pantographic type of relationship between the photographic array and the array of the index mat provides an indication of the position of the carrier during viewing operations.

It is a further feature of this invention to provide a novel matrix array composed of rectangular photographs with the matrix array including a plurality of columns, each column including a plurality of photographic images arranged in series, with the columns being secured to one another at each end and the rectangular photographic images in each column being offset with respect to corresponding images in adjacent columns.

These and other objects of the invention will be more fully appreciated when considered in the light of the following description and the drawings.

DESCRIPTION OF THE PREFERRED EMBODIMENT

Figure 1:
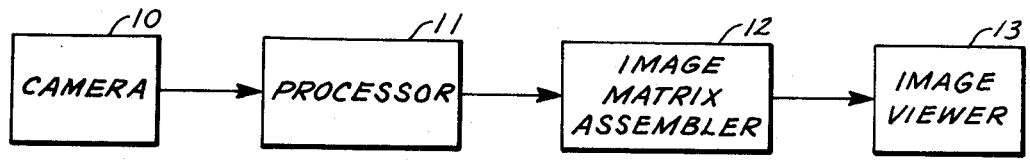
FIG. 1 illustrates a system according to this invention.

Referring first to FIG. 1, a system is illustrated for making microfilm records and viewing the photographs. The system includes a camera 10 which is used to make a photographic record of documents on a strip film. After the camera has been used to make a given number of document recordings in successive frames or image areas on a film strip, one or more frames are skipped without making exposures. This results in producing a strip film with groups of successive exposed frames separated by one or more unexposed frames on the film strip. The camera 10 may be any suitable camera available for performing microfilming operations. The strip film is preferably in a roll or cartridge form, and after a given number of photographic recordings are made, one or more frames may be advanced without exposure as, for example, by placing a lens cap over the lens and operating the camera to advance the film.

An exposed roll of strip film from the camera 10 is processed by a processor 11. The processor 11 may be any one of many well known types of suitable equipment for converting an exposed film strip to a permanent record.

The film strip is next converted to a master or matrix of photographs with the assistance of an image matrix assembler 12. The image matrix assembler 12, explained more fully hereinafter, serves to convert rectangular frames or photographic image areas into a matrix of photographic frames or image areas disposed in columns and rows. The columns are disposed side by side with the frames or photographic image areas offset with respect to corresponding frames or photographic image areas of adjacent columns. The matrix has the form of a parallelogram. The master or matrix array is placed in an image viewer 13 where the individual frames or photographs may be selectively viewed in the manner explained more fully hereinafter.

In one arrangement according to this invention a super 8 cartridge having strip film 8 millimeters in width is employed. Fifteen frames or images are successively exposed to photographically record information after which two frames are advanced without being exposed. Each picture frame has a length of approximately 0.33 inches. Three frames can thus be recorded per inch. The master or matrix array of photographic images are selected arbitrarily to have seventeen columns with each column having 15 exposed frames and two unexposed frames. Six masters or matrix arrays are made from each super 8 cartridge where the cartridge has 50 feet of strip film or a total of 600 inches of strip film. Each super 8 cartridge has a total of 1800 frames or image areas, and a total of 1530 frames or image areas are exposed with 204 frames or image areas not exposed to provide separation between exposed frames on the film strip. A total of only 66 frames or image areas are unused per cartridge of super 8 strip film.

Figure 2:
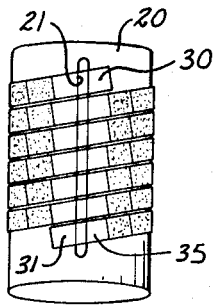
FIGS. 2 through 4 illustrate the steps of a novel method according to this invention for forming an array of photographs wherein the array is in the form of a parallelogram.
Figure 3:
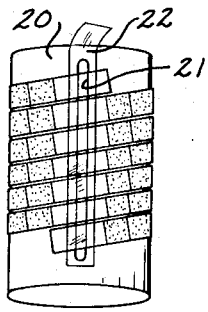
Figure 4:
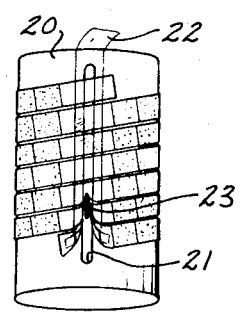
Figure 5:
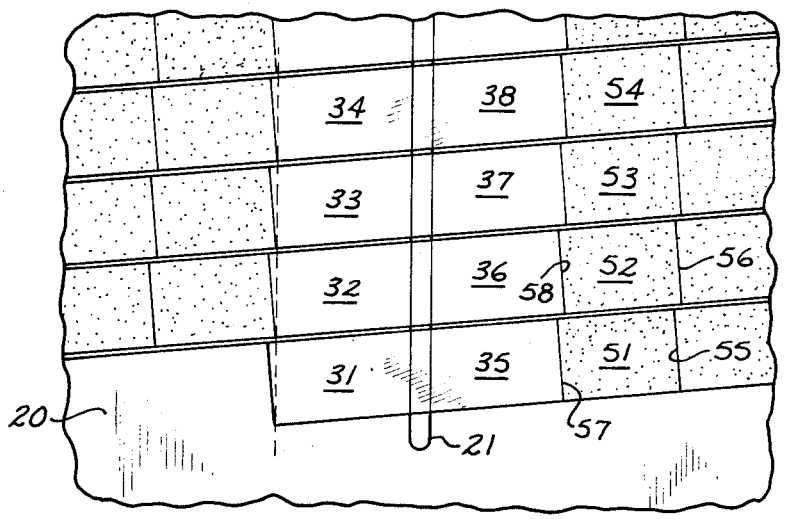
FIG. 5 shows in greater detail a segment of the array illustrated in FIGS. 2 through 4.

Next the method of making a master or matrix array of image areas is described. A roll of strip film is wound around a cylinder drum 20 in the form of a helix as illustrated in FIG. 2. The drum 20 has a slot 21 disposed therein as shown. The frames of the strip film on each side of the slot are unexposed, and hence they are blank or devoid of images. The remaining frames or image areas are used to record photographic information, and this is denoted by the arrangement of dots within the remaining frames shown in FIG. 2. An exploded view of a portion of the helical arrangement of the strip film in FIG. 2 is illustrated in FIG. 5 and is described in more detail subsequently. After a strip film is disposed on the drum 20 in the manner illustrated in FIG. 2, a piece of adhesive tape 22 is placed over the slot 21 in the manner illustrated in FIG. 3. The adhesive tape is any suitable adhesive which adheres to strip film, and many well known types are commercially available. Next the film disposed over the slot 21 is cut or severed. This may be done by inserting a knife blade 23 in the manner shown in FIG. 4 into the slot 21 and moving it from one end of the slot to the other. The knife is inserted to a sufficient depth to sever the convolutions of the helix. The knife severs the adhesive tape and the convolutions of the helical film strips in FIG. 4. A portion of the adhesive tape to the right of the cut secures together one end of each of the severed convolutions, and the portion of the adhesive tape to the left of the cut secures together the other ends of the severed convolutions. Thus a master or matrix array of rectangular frames or photographic image areas are disposed in columns and rows, and the matrix array is in the form of a parallelogram as explained more fully hereinafter.

Referring next to FIG. 5, an exploded view of the area surrounding the lower end of the slot 21 in FIG. 2 is shown. Unexposed frames or blank areas 31 through 34 are disposed on the left side of the slot 21, and unexposed frames or blanks 35 through 38 are disposed on the right side of the slot 21. It is pointed out that the circumference of the drum is equal to the length of one exposed group of frames or image areas plus the length of the unexposed frames or blanks. The strip film is wound in helical form on the drum 20 commencing first with two blank areas or unexposed frames 31 and 35 disposed on opposite sides of the slot 21. As the strip tape is wound about the drum in successive convolutions, the unexposed frames or blanks fall into place symetrically disposed on each side of the slot. The rectangular frames or exposed image areas of successive convolutions are offset with respect to one another. This is illustrated by the frames 51 through 54, for example. The right edge 55 of the frame 51 is offset from the right edge 56 of the frame 52 as shown. Likewise, the left edge 57 of the frame 51 is offset by the same amount from the left edge 58 of the frame 52. It is pointed out that the amount of offset between the frame 52 and the frame 53 is equal to the offset between the frames 51 and 52. This offset is a constant amount between corresponding frames of adjacent convolutions. It is this constant offset between adjacent convolutions which produces a master or matrix array in form of a parallelogram.

Figure 5A:
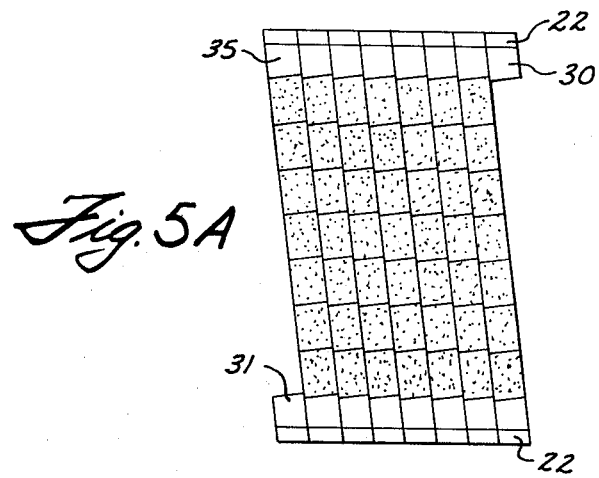
FIG. 5A illustrates an unfinished master or array of rectangular photographs according to this invention.

The master or matrix array in the form of a parallelogram is illustrated in FIG. 5A. The frames 30 and 31 are removed. More specifically, the frame 30 and the associated portion of the tape 22 is cut off, and the frame 31 and its associated portion of the tape 22 is severed. The frames 30 and 31 may be discarded.

Figure 6:
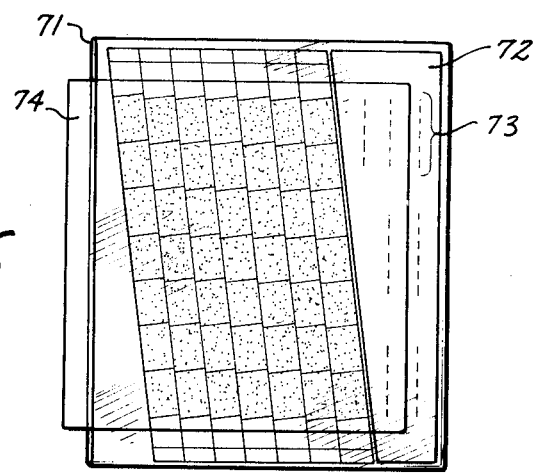
FIG. 6 illustrates a master or array of rectangular photographs disposed in an envelope in combination with an index header and a photosensitive card or plate for making a contact print or duplicate of the master.

Next the matrix array in FIG. 5A is placed in a transparent envelope 71 in the manner illustrated in FIG. 6. First an index header 72 is placed in the transparent envelope 71 to the right of the matrix array as shown. The index header 72 is employed to record indicia which is utilized to identify the location in the matrix of stored information. For example, the indicia designated by the numeral 73 may be employed to indicate the nature of the data stored in column 1, for example. Similarly other indicia may be employed to identify information stored in other columns.

Figure 7:
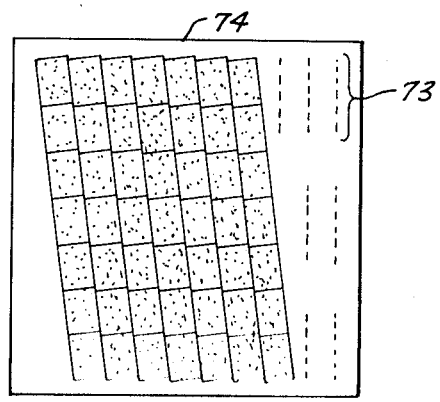
FIG. 7 illustrates a duplicate or fiche of the arrangement shown in FIG. 6.

A photosensitive plate or card 74 is inserted in the transparent envelope 71 behind the matrix array and the indicia header. An image of the matrix array and the indicia header is made on the photosensitive plate 74. After the plate 74 is processed, a fiche 74 in FIG. 7 is produced. The fiche 74 includes an image of the matrix array and the indicia header of FIG. 6. Matrix array portion of the fiche in FIG. 7 includes a plurality of rectangular photographic images disposed in columns and rows with the rectangular photographic images in each column being offset with respect to the corresponding rectangular photographic image in adjacent columns. The indicia in FIG. 7 is useful in locating information in the matrix array when employed in the image viewer 13 in FIG. 1. That index information, unlike the information recorded in the matrix array, is not reduced in size. In this connection it is pointed out that the photographic images in the array are so small as to be difficult, if not impossible, to read with the naked eye, but the indicia is sufficiently enlarged to be easily read with the naked eye. It is pointed out that the small frames of the matrix array according to a preferred embodiment record the information from a document which may be 8½ inches wide and 13 inches high. The ratio of reduction is 40 : 1. Next the viewing operation is discussed.

Figure 8:
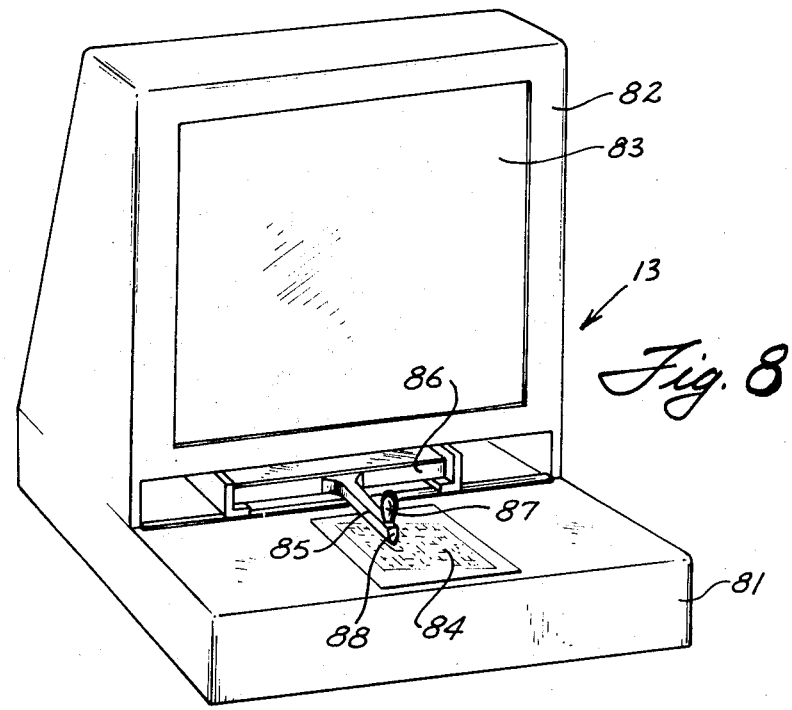
FIG. 8 illustrates an image viewer according to this invention.

Reference is made next to FIG. 8 which illustrates in detail the image viewer 13 shown in block form in FIG. 1. The image viewer includes a base 81 on which is disposed a screen housing 82. A viewing screen 83 is set back in the screen housing 82 as illustrated. The setback of the viewing screen 83 reduces interference as the result of reflected ambient light. An index mat 84 is disposed on the upper surface of the housing 81. An arm 85 is attached to a carrier 86, and the arm extends over the index mat 84 as shown. Placed on the end 88 of the arm 85 is a handle 87. The end 88 serves as an index pointer. A document or matrix array of photographic images may be disposed on the carrier. The arm 85 is operated to move the carrier to the right or left selectively, and the arm 85 is operated to move the carrier back and forth selectively, thereby to position the carrier at any desired location. This permits the carrier to be positioned so that a selected picture frame may be projected on to the screen 83 for viewing purposes.

Figure 9:
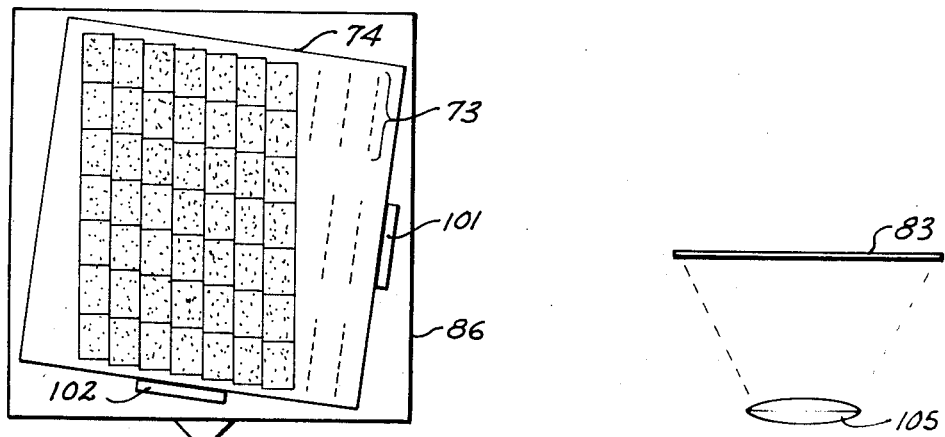
FIG. 9 shows in greater detail the arrangement of the carrier and the index mat utilized for selecting a given photograph for viewing purposes.

The manner in which the carrier 86 and the index 84 cooperate is illustrated in FIG. 9. The index mat 84 includes an index matrix composed of coordinate elements disposed in columns numbered 1 through 7 and rows lettered A through G. The index matrix 84 in figure 9 has the form of a parallelogram. The fiche 74 pair in FIG. 9 is oriented at an angle with respect to the base of the carrier 86 as illustrated in FIG. 9. A pair of positioning guides 101 and 102 serve to orient the fiche 74 on the base of the carrier 86. The carrier 86 and the index mat 84 have a pantographic type relationship whereby when the carrier is moved from one position to another, the frame in the fiche 74 which is projected onto the viewing screen 83 is indicated on the index mat 84 by the pointer 88.

Figure 10:
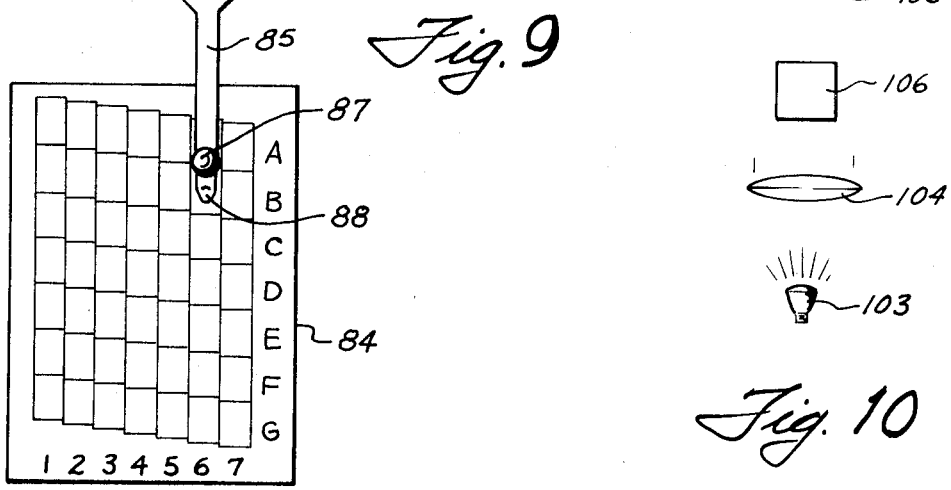
FIG. 10 illustrates diagramatically the projection system employed in the viewer of FIG. 8.

The image viewer 13 in FIG. 8 includes a conventional projection system which is schematically illustrated in FIG. 10. A light source 103 is projected through a lens system 104 and 105. Light passes through a picture frame 106, and the image of this frame is projected onto the screen 83.

While the invention has been particularly shown and described with reference to a preferred embodiment, it will be understood by those skilled in the art that various changes in the form and details may be made therein without departing from the spirit and scope of the invention.

What is claimed is:

1. A method of producing a master or matrix of image areas in the form of a parallelogram, said method comprising the steps of:
    a. exposing a series of image areas on a film strip and providing given areas at predeterminedly spaced locations along the length of the film strip,
    b. processing the film strip to produce image transparencies thereon,
    c. arranging the film strip in the form of a helix with at least portions of said given areas aligned,
    d. securing said given areas to one another, and
    e. cutting the film strip through all of said given areas,
whereby a matrix of image areas in the form of a parallelogram is formed.

2. The method of claim 1 further including the step of:
    making a phototransparency of the matrix array and adding indicia thereby to form a fiche.

3. A method of producing a master or matrix of image areas in the form of a parallelogram, said method comprising the steps of:
    a. exposing a series of image areas on a film strip and providing given areas at predeterminedly spaced locations along the length of the film strip,
    b. processing the film strip to produce image transparencies thereon,
    c. winding the film strip to form adjacent convolutions with portions of said given areas aligned,
    d. securing said given areas to one another, and
    e. cutting the film strip through all of said given areas,
whereby a master or matrix of image areas in the form of a parallelogram is formed.

4. The method of claim 3 further including the step of:
    making a phototransparency of the master or matrix of image areas and adding indicia thereby to produce a fiche.

5. A method of making an array of photographic images from a strip of film having photographic images thereon with unexposed areas positioned at given intervals on said strip of film, the method comprising the steps of:
    winding the film strip in the form of a helix with the unexposed areas in alignment,
    securing the unexposed areas to one another, and
    cutting the film through the unexposed aligned areas thereby to form a matrix array of photographic images with the array having the form of a parallelogram.

* * * * *